Aug. 27, 1968  G. MARTIN  3,398,995
ANTI-SKID CONTROL SYSTEM FOR RAILWAY VEHICLES
Filed Oct. 10, 1966  5 Sheets-Sheet 1
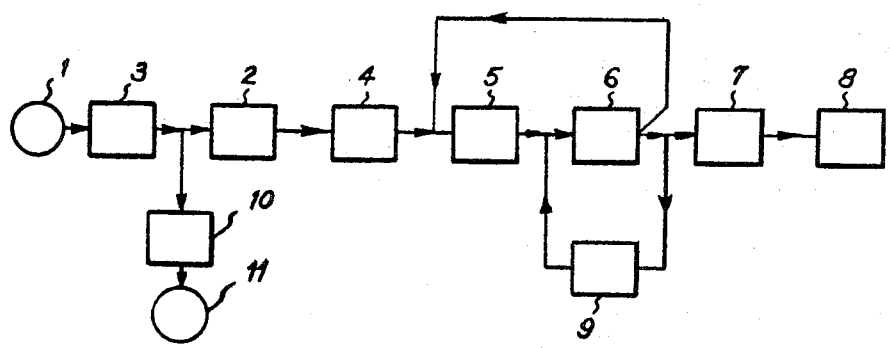
FIG. 1
FIG. 8
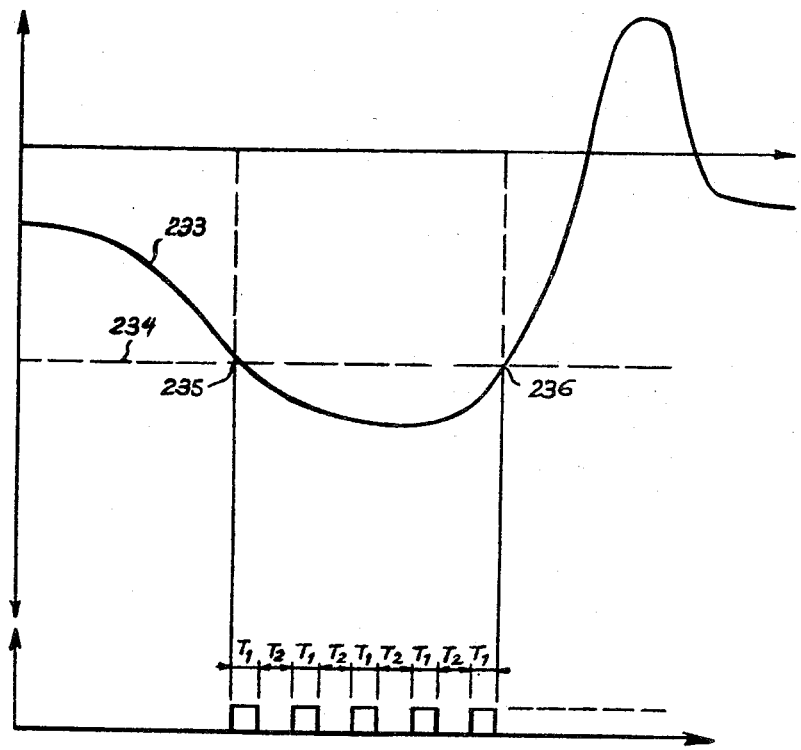
INVENTOR
GERARD MARTIN
BY Ralph W. McIntire, Jr.
ATTORNEY INVENTOR
GERARD MARTIN
BY Ralph W. McIntire, Jr.
ATTORNEY Aug. 27, 1968     G. MARTIN     3,398,995
ANTI-SKID CONTROL SYSTEM FOR RAILWAY VEHICLES
Filed Oct. 10, 1966     5 Sheets-Sheet 4
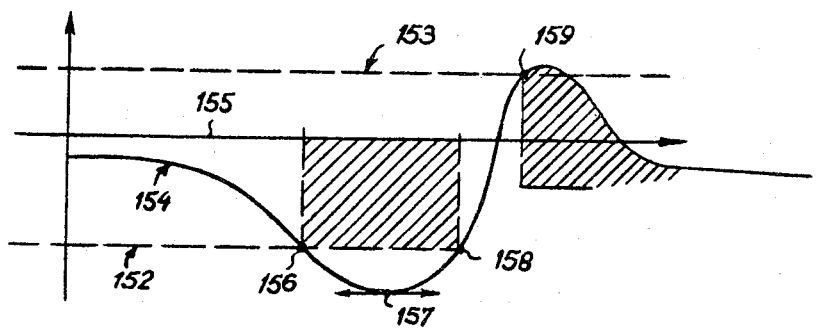
FIG. 4
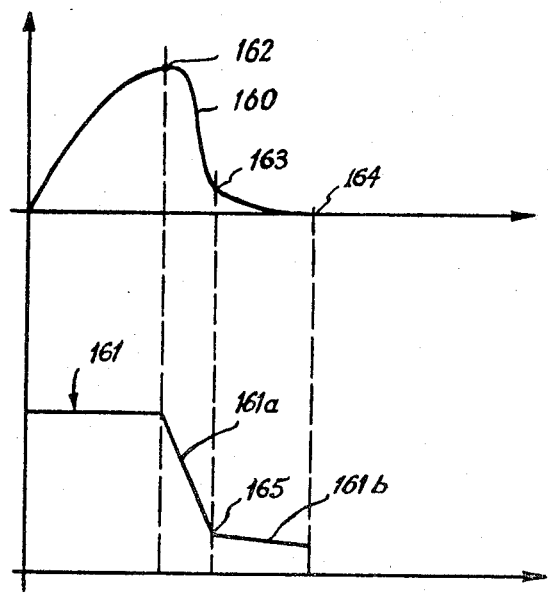
FIG. 5
FIG. 6
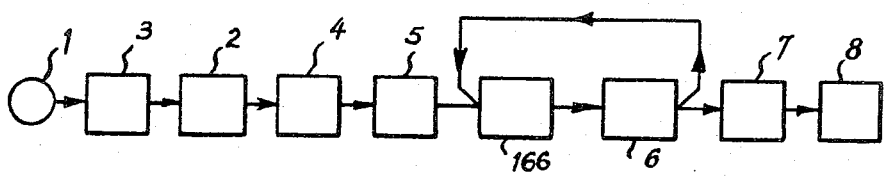
INVENTOR
GERARD MARTIN
BY *Ralph W. McIntire, Jr.*
ATTORNEY

United States Patent Office 3,398,995
Patented Aug. 27, 1968

3,398,995
ANTI-SKID CONTROL SYSTEM FOR
RAILWAY VEHICLES
Gerard Martin, Villemomble, France, assignor to Compagnie des Freins et Signaux Westinghouse, Paris, France
Filed Oct. 10, 1966, Ser. No. 585,338
9 Claims. (Cl. 303—21)

ABSTRACT OF THE DISCLOSURE

Apparatus for avoiding slipping or sliding of a vehicle wheel on its rolling surface. The apparatus comprises a novel combination of circuitry including a wheel-driven generator, a differentiator circuit, a discriminator circuit, a bi-stable alternator, a multivibrator and electro-magnet valves for controlling the admission or release of air to a vehicle brake cylinder in accordance with a variation in rate of wheel speed change with respect to a first uniform amplitude of reference during deceleration and with respect to a second uniform amplitude of reference during acceleration.

Background of the invention

It is known that many schemes of control enable an action on the brake control when one or more wheels of a railway vehicle begin to slip or slide on a rail. Such types of apparatus usually make a comparison of the relative speed of two or more adjacent wheels or between a wheel that is braked and an unbraked wheel and have the difficulty of slow response which in general leads to the tardy interventions on the brake control device. During release of the brakes, this slowness of control causes the need of an excessive venting of air from the brake cylinder. This then results in an undesired lengthening over normal stopping distance, an inconvenience which becomes an increasing danger as the vehicle attains higher and higher speeds.

The present invention proposes a corrective means for the difficulties indicated above and employs a new procedure of adapting the brake application to the state of adhesion of a wheel of a vehicle in motion to the rail surface.

According to the invention, detection of the direction of variation of the speed of the wheel is made. The amplitude of the variation of the actual speed is compared to a first amplitude of reference. Upon a variation of an amplitude greater than that of the reference, the brake control device is put into or out of service according to the direction of the variation of the actual speed, and the braking action is adjusted such that the amplitude of the speed variation will have attained a value below that fixed by a second reference amplitude.

This procedure has the advantage of enabling the control of the brake action by the help of information obtained by a single study of the speed of rotation of a considered wheel and not by a comparative study which is subject to error because the element of comparison itself may vary.

According to one feature of the invention after a variation of speed of a greater amplitude than that of reference, a quick and slight action is initiated on the brake control in a direction dependent on that of the direction of the variation of the speed.

According to another feature of the invention, after a variation of speed of greater amplitude than that of reference, a brake control device is alternately placed into and out of service in a preferably regular and rapid sequence.

Summary

The present invention has also as its object to provide means to put this aforesaid procedure into operation. This means comprises essentially a direct current generator driven by the wheel, delivering a voltage the amplitude of which is proportional to the speed of the wheel and charging a differentiator circuit, a double crest signal discriminator connected to the differentiator circuit and connected to a bi-stable alternator controlling one stage of power supplying the brake control device.

According to one embodiment of the invention the bi-stable alternator is connected to the discriminator by way of a multivibrator and the brake control device is made up essentially by an electromagnet valve controlling the admission or release of air of the brake cylinder acting on this wheel.

According to another embodiment of the invention, during brake release, the brake cylinder is cut off from the supply and placed in communicaton with an expansion reservoir having a choked opening to the atmosphere.

According to a preferred embodiment of the invention the direct current generator is made up by a polyphase generator having a great number of poles charging a filter unit preferably at asymmetric time constant by way of a diode bridge.

Other features of the invention will appear in the course of the following detailed description and reference to the attached drawing. It is intended that the description and the drawing are only an illustrative example of the invention.

FIGURE 1 is a diagrammatic view of one embodiment of the apparatus according to the invention.

FIGURE 4 is a view showing the character of a curve of registered deceleration on a wheel equipped with the apparatus shown in FIGURE 1.

FIGURE 5 is a view showing the character of a curve of the loss of adhesion registered on a wheel equipped with the apparatus shown in FIGURE 1.

FIGURE 6 is a view representing diagrammatically a second example of an embodiment of an apparatus according to the invention.

FIGURE 8 is a view showing the character of a curve of deceleration registered by a wheel equipped with the apparatus shown in FIGURE 6.

Figure 2:
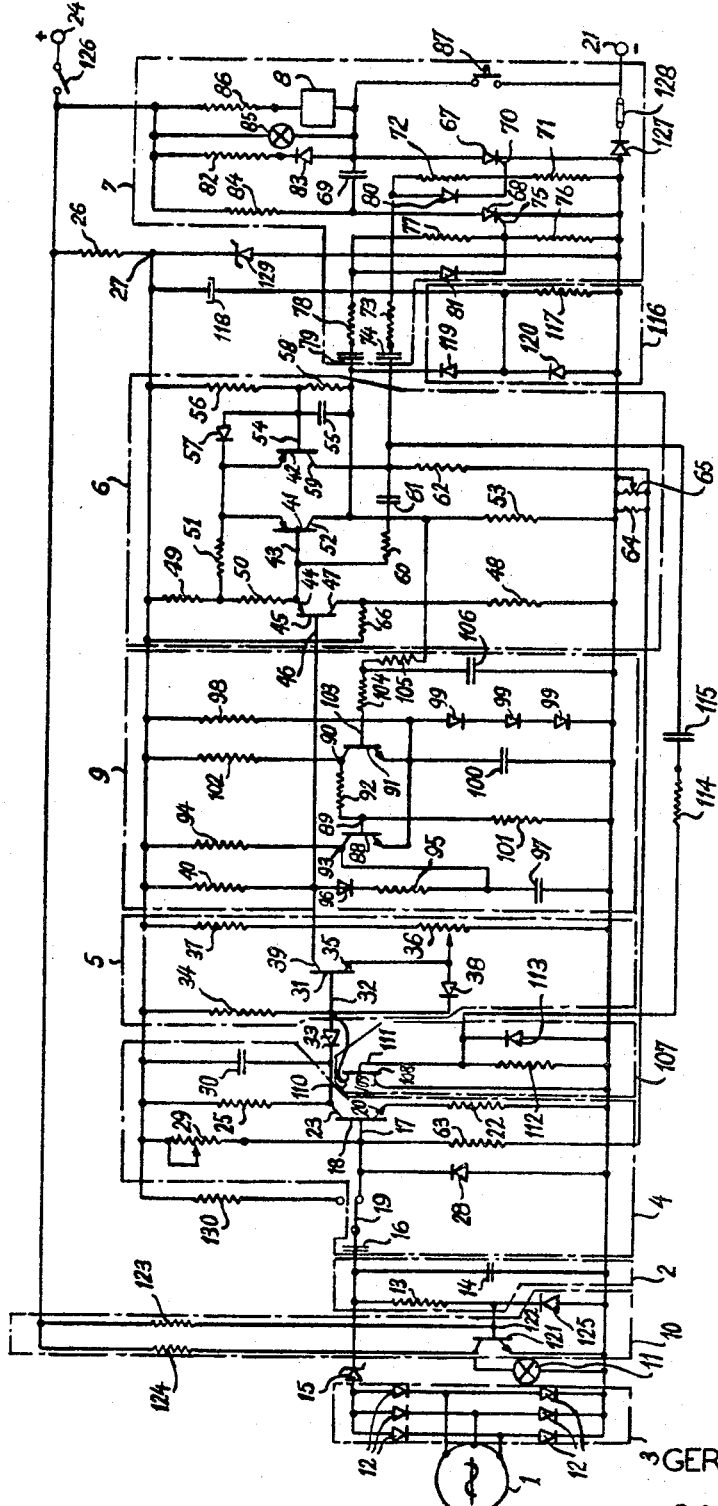
FIGURE 2 is a detailed electrical diagram of the embodiment of the apparatus represented by FIGURE 1.

As is shown in FIGURE 1, the apparatus comprises an alternator 1 charging a filtering unit 2 by a means of a full wave rectifier 3. A modifying circuit 4 to detect drift of the signals delivered by the filter unit 2 is connected to a discriminator of double crested signals. The discriminator 5 charges a bi-stable alternator 6 controlling a power stage 7 which charges the brake control device 8.

A delay unit 9 is connected to the leads of the bi-stable alternator 6. This delay unit is put into service by the alternator and is capable of returning to its initial condition at the end of its proper delay.

The apparatus can comprise eventually a circuit 10 of control of rotation of the alternator. This circuit charges a visual indicator 11.

The alternator 1 preferably has a great number of poles and delivers polyphase voltages of value proportional to that of the speed of rotation of the wheel. These voltages are rectified and filtered and appear at the outlet of the filter unit 2 as a direct-current voltage, which is proportional to the speed. This voltage is applied to the circuit 4 which delivers a signal the amplitude of which is equal to the absolute value of the acceleration and of a polarity dependent on the direction of variation of the speed. The amplitude of this signal is compared with an amplitude of reference by means of the discriminator 5. When the amplitude of the signal is superior to that of the first crest of reference, the discriminator 5 unlocks the alternator 6 which controls the stage of power 7. This unit charges the brake control device which may be an electromagnet valve or a relay or a contractor having an action more or less direct on the motor device applying a torque on the wheel.

To avoid an untimely control operation due to the temporary condition following the change of conditions of the unit 6, the outlet of this unit is connected indirectly to the output of circuit 4. The delay unit 9 is unlocked by the discriminator and enables the return of the unit 6 to its initial condition so that at the end of the delay period, the signal delivered by the circuit 4 does not have an amplitude below that of the second crest of discrimination.

In the embodiment shown in FIGURE 2, the alternator 1 is of the three-phase type and the rectifier 3 is made up by an assembly of diodes 12 mounted together. The filter circuit 2 is made up essentially by a resistance 13 and a condenser 14 mounted in parallel and connected between the terminals of the rectifier 3. A Zener diode 15 is inserted between the filter unit 2 and the rectifier 3. The differentiator circuit 4 comprises a condenser 16 connected to the filter unit 2, to the base 17 of a type NPN transistor 18 by way of the switch 19. The emitter 20 of the transistor 18 is connected to the negative terminal 21 of a source of direct current by way of resistance 22. The collector 23 of the transistor 18 is connected to the positive terminal 24 of the source of the direct current by way of a resistance 25 and another resistance 26 playing the role of protection and to enable obtaining substantially constant potential on the charging terminal 27 of the apparatus. The base 17 is connected to the negative terminal 21 of the source of direct current by way of a diode 28. The polarization of the base 17 is assured by means of an adjustable resistance 29 connected to the charging terminal 27. The collector 23 is connected also to the terminal 27 by way of a condenser 30. The discriminator 5 of the lower crest signals of amplitude is made up essentially by a type NPN transistor 31 the base 32 of which is connected to the collector 23 of transistor 18 by way of a diode 33. The polarization of the base 32 is assured by means of a resistance 34 connected to the terminal 27. The emitter 35 of the transistor 31 is connected to the negative terminal 21 by way of a resistance 36 mounted as a potentiometer and connected to the terminal 27 by a resistance 37. The emitter 35 is also connected to the base 32 by way of a diode 38. The polarization of the collector 39 of the transistor 31 is assured by means of a charging resistor 40 connected to the terminal 27.

The bi-stable unit 6 is made up essentially by two type PNP transistors 41 and 42 mounted in common emitter. The base 43 of the transistor 41 is connected to the collector 44 of a type PNP transistor 45 playing the role of an amplifier. The base 46 of the transistor 45 is connected to the collector 39 of the transistor 31 while the collector 47 of the transistor 45 is connected to the negative terminal 21 by way of a resistance 48.

The polarization of the emitter 44 is assured by means of two resistances 49 and 50 mounted in series and connected to the terminal 27. The polarization of the emitters of the transistors 41 and 42 is assured by means of a resistance 51 connected to the common terminal of resistances 49 and 50. The collector 52 of the transistor 41 is connected to the negative terminal 21 by way of a charging resistance 53 and is connected to the base 54 of the transistor 42 by way of a condenser 55. The polarization of the base 54 is assured by means of a resistance 56 connected to the terminal 27. The base 54 of the transistor 42 is otherwise connected to the common emitters of the transistors 41 and 42 by way of a diode 57. Further, the base 54 is connected to the collector 52 by way of a resistance 58. The base 43 of the transistor 41 is connected to the collector 59 of the transistor 42 by way of a resistance 60 and a condenser 61 mounted in series.

The collector 59 of the transistor 42 is otherwise connected to the base 17 of transistor 18 by way of a first resistance 62 and a second resistance 63. The common terminal of these two resistances is connected to the negative terminal 21 of the source of direct current by way of two resistances 64 and 65 mounted in parallel, the resistance 65 being variable. The collector 47 of the transistor 45 is connected to the terminal 27 by way of a resistance 66.

The power circuit 7 comprises essentially two thyratrons 67 and 68 connected by a condenser 69. The control electrode 70 of the thyratron 67 is connected to the negative terminal 21 of the source of direct current by way of a resistance 71. It is otherwise connected to the collector 59 of the transistor 42 by way of a first resistance 72 connected to a second resistance 73 these resistances being mounted in series with a condenser 74. In like manner the control electrode 75 of the thyraton 68 is connected to the negative terminal of the source of direct current by way of a resistance 76 and also to the collector 52 of the transistor 41 by way of a first resistance 77 and a second resistance 78 and a condenser 79, these three elements being mounted in series. A diode 80 is mounted between the terminals of the resistance 72.

In the same manner, a diode 81 is mounted between the terminals of the resistance 77. The principal circuit of the thyratron 67 is connected, first, to the negative terminal 21 and also to the positive terminal 24 by way of a resistance 82 and a diode 83 mounted in series.

In the same manner the main circuit of the thyratron 68 is connected to the negative terminal 21 first, and secondly to the positive terminal 24, this latter connection being effected through a resistance 84.

A colored indicator lamp 85 is connected to the terminals of the resistance 84 first, and to the resistance 82 and diode 83 secondly. The control device 8 is mounted in parallel with the colored lamp 85 and in series with a protective resistor 86. The control device 8 can also be connected directly to the source of direct current, this connection being by the aid of a switch 87 of the push-button type connecting said device to terminal 21.

The delay unit 9 comprises a type NPN transistor 88, the base 89 of which is connected to the collector 90 of a type NPN transistor 91 by way of a resistance 92. The collector 93 of the transistor 88 is connected, first, to the terminal 27 by way of a charging resistor 94 and secondly to the collector 39 by resistance 95 and diode 96 mounted in series. The collector 93 is also connected to the negative terminal 21 by way of a condenser 97. The transistors 88 and 91 have their emitters connected together and their polarization is assured by means of a resistance 98 connected to the terminal 27 and by three diodes 99 connected to the terminal 21. A condenser 100 connected to the emitter 91 is mounted in parallel with three series-connected diodes 99. The polarization of the base 89 of the transistor 88 is assured by means of a resistance 101 connected to the negative terminal 21 and by resistance 92 and 102 connected to terminal 27. A charging resistance 102 connects the collector 90 to the charging terminal 27. The base 103 of the transistor 91 is connected to the collector 52 of the transistor 41 by way of the two resistances 104 and 105 mounted in series, a condenser 106 connecting the common terminal of these two resistances to the terminal 21.

The apparatus which has been described comprises, additionally, a circuit 107 made up principally by a type NPN transistor 108 the emitter 109 of which is connected to the terminal 21, its collector 110 is connected to the base 32 of the transistor 31 and its base 111 is connected to the terminal 21 by way of a resistance 112 and a diode 113 mounted in parallel. The base 111 is otherwise connected to the collector 59 of the transistor 42 by way of a resistor 114 and a condenser 115 mounted in series.

The apparatus also comprises a circuit 116 constituted by a resistance 117 and a condenser 118 mounted in series between the terminal 27 and the terminal 21. Two diodes 119 and 120 are mounted in series and connect the terminal 21 to the collector 52 of transistor 41. The common terminal of the diodes 119 and 120 is connected to the common terminal of the condenser 118 and the resistance 117. The control circuit 10 comprises a type NPN transistor 121 the emitter of which is connected to the negative terminal 21, its base 122 is connected to the positive terminal 24 by way of a resistance 123 and its collector is connected to the terminal 24 by way of a charging resistance 124. The base 122 is, otherwise, connected to the terminal 21 by way of a diode 125. A colored signal lamp 11 is connected between the collector of transistor 121 and the negative terminal 21.

The apparatus comprises other various accessories such as a switch 126 placed next to the terminal 24, a diode 127 and a fuse 128 placed next to the terminal 21, a Zener diode 129 connecting the terminal 21 to the terminal 27 for purpose of regulation and a resistance 130 connecting the terminal 27 to the third terminal of the switch 19 for purpose of verification of operation.

Figure 3:
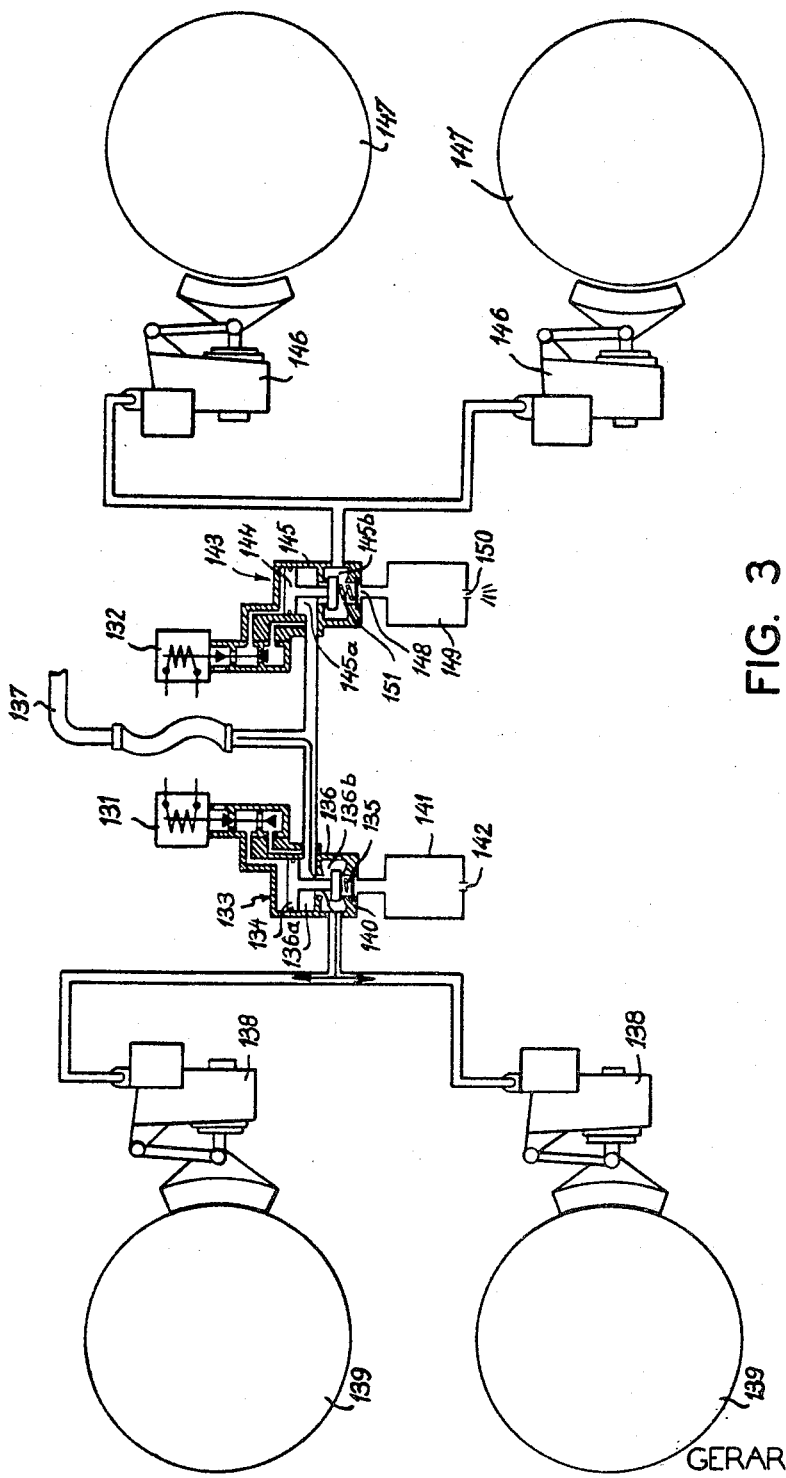
FIGURE 3 is a schematic view showing the arrangement of the brake control devices.

The control device 8 may comprise two electromagnet valves 131 and 132 of the assembly shown in FIGURE 3. The electromagnet valve 131 controls a pneumatic relay 133 the piston 134 of which is biased by a spring 135 and the cylinder 136 of which is connected to a distributor of air under pressure by a passageway 137. The cylinder 136 has two chambers 136a and 136b communicating respectively with the distributor and with two brake cylinders 138 associated with the two wheels 139.

The chamber 136b communicates by a choked opening with an expansion reservoir 141 which itself is open to the atmosphere via an orifice 142.

The electromagnet valve 133 controls, in like manner, a pneumatic relay 143 made up principally by a piston 144 sliding in a cylinder 145 and having two chambers 145a and 145b. These two chambers communicate respectively with the air supply passageway 137 and two brake cylinders 146 associated with two wheels 147. The chamber 145b comprises an opening 148 communicating with an expansion reservoir 149 having an orifice 150 opening to the atmosphere. The piston 144 is also biased by a spring 151.

According to the position of the electromagnet valves, air under pressure is communicated from the source to the brake cylinders, as shown for the assembly corresponding to the electromagnet valve 131, or the brake cylinders communicate with the expansion reservoirs as shown for the assembly corresponding to the electromagnet valve 132.

The general operation of the apparatus which has been described above will be explained in detail hereinafter.

At the point of operational view in detail, the Zener diode 15 enables disconnecting the apparatus when the speed of rotation of the wheel becomes below a predetermined speed for example 10 km./ln. (6.2 m.p.h.). The diode 125 in series with the resistance 13 enables a practically constant voltage after the speed of rotation of the wheel is the limit indicated above. This voltage enables blocking the transistor 121 which causes illumination of the indicating lamp 11.

The resistance of the differentiating circuit is made up by the assembly of resistances 29 and 63. The resistance 130 limits the charging current of the condenser 16 at the time of operating control. The switch 19 is normally in the position shown on the drawing, and by operating this switch the condenser 16 is charged by the resistance 130. Upon return of switch 19 to its initial position, the condenser 16 discharges into the assembly indicated above. All this comes about if the wheel should undergo a deceleration during the time when the condenser 16 discharges. There is unlocking of the brake control.

The resistance ensemble 64, resistance 65 enables the control of the standard of acceleration corresponding to this return to the initial state of the apparatus.

The diode 28 enables a compensation of the drift in temperature while the condenser 30 conditions the filtering of the drift of the signal.

The diode 33 enables a unidirectional connection avoiding charging the amplifier while the delivered signal is not superior to that of the crest of discrimination.

The diode 38 prevents a reverse voltage at the emitter-base of transistor 31, which is very important especially for a signal of high amplitude.

The transistor 108 and its base circuit constitute a kind of "unsensibility" circuit. Actually, after the apparatus has detected a deceleration for example, it is rendered unsensible to an acceleration during a short period of time fixed by the constant of time corresponding to the resistance 114 and condenser 115 assembly. This avoids transistory signals at frequencies superior to that of response of the degree of power which may not come to disturb the operating in exciting the control device 8 permanently. The diode 113 enables the assembly of resistance 114 and condenser 115 to have the same impedance for charge and discharge.

The transistor 31 is normally a conductor in expectation. When the voltage between the collector of transistor 18 and the negative terminal becomes less than that existing between the emitter 35 of transistor 31 and the negative terminal, the transistor 31 becomes nonconductive.

In this case the resistance 40 enables lock up of the transistor 45.

The potential of the emitter of transistor 31 is rendered variable in its desired crest of discrimination by means of the potentiometer 36.

The resistances 56 and 58 form a divider the midpoint of which is connected to the base 54 of the transistor 42. When the transistor 41 is conductive the transistor 42 is blocked by the negative potential from the mid-point of the divider connected to its base. When, contrariwise, the transistor 41 is blocked, the resistance 58 constitutes a control resistance of the base of the transistor 42. The condenser 55 has for its purpose to accelerate this control. The reaction produced by the assembly of the resistance 60 and condenser 61 enables acceleration of the degree of conduction or nonconduction of the transistor 41. The diode 57 has for its purpose limiting the reverse voltage emitter-base of transistor 42.

The condenser 118 and the diode 119 enable the placing under charge to cause quick return of the alternator to its initial condition. This avoids a transient excitation of the control device 8. The voltage being maintained, the condenser 118 is charged to the value of the charging voltage imposed by the Zener diode 129 by way of resistance 117. The diode 119 is then polarized in reverse, that which thus avoids disturbance of the operation of the alternator. The diode 120 enables quicker discharge of condenser 118 at the time of opening of switch 126, which permits the condenser 118 to always be ready to place the alternator in its initial condition, even when irregular operations of the switch 126.

The resistances 73 and 78 limit the amplitude of control impulses of the thyratrons 67 and 68. The parallel assemblies, first, resistance 77 and diode 81, and secondly, resistance 72 and diode 80 offer a weak resistance to the passage of a control impulse. In the reverse direction, the resistance 77 or resistance 72 enables the discharge of the condenser 79 or condenser 74 in order to avoid a reaction of the thyratron toward the alternator.

The two thyratrons of the power stage are mounted in alternation in the usual manner. The resistance 84 charges the thyratron 68. The resistance 86 in series with the control device 8 charges the thyratron 67. The colored light 85 enables a visual control of energization of the control device. The diode 83 limits the amplitude of the overcharge produced when the thyratron 67 operates. The resistance 82 limits the current in the diode 83 limiting, further, the delay of return of the control device to its initial condition. The condenser 69 enables the "breathing" of the thyratrons 67 and 68.

The operation of the control means is as follows: in anticipation of a "deceleration" signal of excessive amplitude, for example, the transistor 41 (FIGURE 2) is conducting and the condenser 106 is charged across the resistance 105. The transistor 91 becomes a conductor while the transistor 88 becomes blocked. The condenser 97 is charged to maximum voltage controlled by the Zener diode 129 across the resistance 95 by reason of the presence of diode 96.

At the appearance of the signal of deceleration, the transistor 41 becomes a conductor. The condenser 106 is completely discharged into the resistor 104 and the base 103 of the transistor 91 first and secondly in the combined resistor 105 and resistor 53. If the transistor 41 is made conductive by an acceleration signal of sufficient amplitude before the voltage to the leads of the condenser 106 becomes less than that existing in the leads of the diode 99, the transistors 88 and 91 remain as they are. If no signal renders the transistor 41 conductive, the condenser 106 continues its discharge and the transistor 91 is blocked rendering the transistor 88 conductive by way of the resistance 92. The condenser 97 discharges and the transistor 45, like the transistor 41 is made conductive by the signal crossing the diode 96 and the resistor 95. The transistor 91 becomes conductive after a fixed period of time corresponding to the combined resistance 105 and condenser 106. The transistor 88 becomes nonconductive. This may bring on a blockage of the transistor 45 resulting in a lock-up, that is a premature return to the initial state. It is for the purpose of avoiding this lock-up that the condenser 97 maintains the transistor 45 conductive during a period permitting the drift circuit to render the transistor 31 conductive. This is produced after the voltage of reaction coming forth from the resistance 65 disappears. The transistor 31 again becomes conductive after a delay corresponding to the period of time of the resistance 25 and condenser 30 assembly.

FIG. 4 illustrates an example of operation of the apparatus. The broken line 152 corresponds to the starting point of discrimination of the discriminator 5. The value of this starting point is adjusted by that of the potentiometer 36. The broken line 153 corresponds to the starting point adjusted by the resistance 65. The curve 154 represents the drift of the speed registered on one wheel equipped with means according to this invention. The straight line 155 corresponds to zero acceleration. The example shown corresponds to the beginning of slip of a wheel. When the deceleration of the wheel reaches the point 156 located at the level 152, the discriminator 5 sends out a signal which energizes the magnet valve 131 for example, which moves from the position shown on the FIGURE 3 to that controlling a displacement of the piston 134. The piston then intercepts the passage of air from the distributor to the brake cylinders and causes the air located in the brake cylinders to release into the reservoir 141. The resulting reduction of pressure is rapid. The deceleration of the wheel diminishes more slowly until the point 157 (where the curve becomes horizontally tangent). The drift of the speed changes direction of variation and increases. During the changing of the state of the control until 6 corresponding to the point 156, FIG. 4, the transistor 42 is made conductive. The current in the resistance 62, in series with the resistor 64 which is also in parallel with the potentiometer 65, charging transistor 42 determines a signal on the leads of the resistor 64 and potentiometer 65 in parallel. The amplitude of this signal (adjustable by the potentiometer 65) becomes additive in series with the resistance 63 to the leads of which exists the deceleration signal and confirms the position of the detector 5.

When the deceleration signal again strikes the line 155 corresponding to zero deceleration the signal springs from junction of resistance 62 first, and resistance 64 and potentiometer 65 secondly, and maintains the control unit 6 in its condition.

It then requires that an acceleration signal of contrary polarity shall appear at the leads of the resistance 63 sufficient to equalize and even to surpass the signal put out by the divider providing the charge of transistor 42.

When the point 159 is attained the transistor 42 again becomes nonconductive and the signal reinjected in series disappears which confirms this new state. The magnet valve 131 is no longer energized and returns to its initial position. The pressure is then applied anew into the brake cylinders.

FIG. 5 illustrates in another manner the operation which has been indicated. The curve 160 represents the loss of adherence of the wheel on the rail at the beginning of slipping. The curve 161 represents the pressure present in the brake cylinders during their operation. The top 162 of the curve 160 corresponds to the energization of the magnet valve 131. The point 163 of the curve 160 corresponds to the point 157 of the curve 154. The point 164 of the curve 160 corresponds to the point 159 of the curve 154.

When the loss of adherence has not yet attained its peak 162, the pressure to the brake cylinders is maximum. After the magnet valve 131 is energized the air located in the brake cylinders reduces into the reservoir 141. The pressure reduces very quickly as shown by the portion 161a of the curve. At the point 165 of the curve 161, the pressure present inside the reservoir 141 and in the brake cylinders is substantially equal. From this time, the air in the cylinders and the reservoir cannot escape except by way of the choke orifice 142 such that this venting will be very slow. The pressure in the brake cylinders continues to reduce as shown by the portion 161b of the curve, but this rate of reduction is very slow. Thus, the quantity of air taken for this operation is relatively small.

The operation which has been indicated has taken as the example the control of the magnet valve 131. It is equally evident that this control may be that of the magnet valve 132. These two magnet valves are identical and occupy respectively on the drawing their two possible locations. The magnet valve 131, in the position shown, enables the flow of air under pressure from the distributor or control valve (not shown) to the brake cylinders, while the magnet valve 132 in its position shown enables the release of air from the brake cylinders to the expansion reservoir 149.

Another embodiment of the means according to the invention is shown by the synoptic scheme of FIG. 6. This arrangement differs from that shown on FIG. 1 essentially by the presence of a multivibrator 166 inserted between the detector 5 and bi-stable control unit 6.

The operation of this means differs from that described above essentially in that the brake control device 8 is alternately placed in and out of service in rapid and preferably regular succession. Actually, after the signal delivered by the shunt circuit 4 to a greater amplitude than that of the differentiation of circuit 5, which unlocks the multivibrator 166 which, itself, actuates the bi-stable control unit 6. As indicated above, the control unit 6 controls the degree to which the device 8 is charged, but this charging is modulated by the multivibrator 166. The outlet of the control unit 6 is connected otherwise to the entrance of the multivibrator 166 to form a counterreaction. This counterreaction is mainly for the purpose of imposing the complete passage of the control signal for energization of unit 8, before a final relocking of the multivibrator. This avoids an erroneous permanent energization of unit 8.

Figure 7:
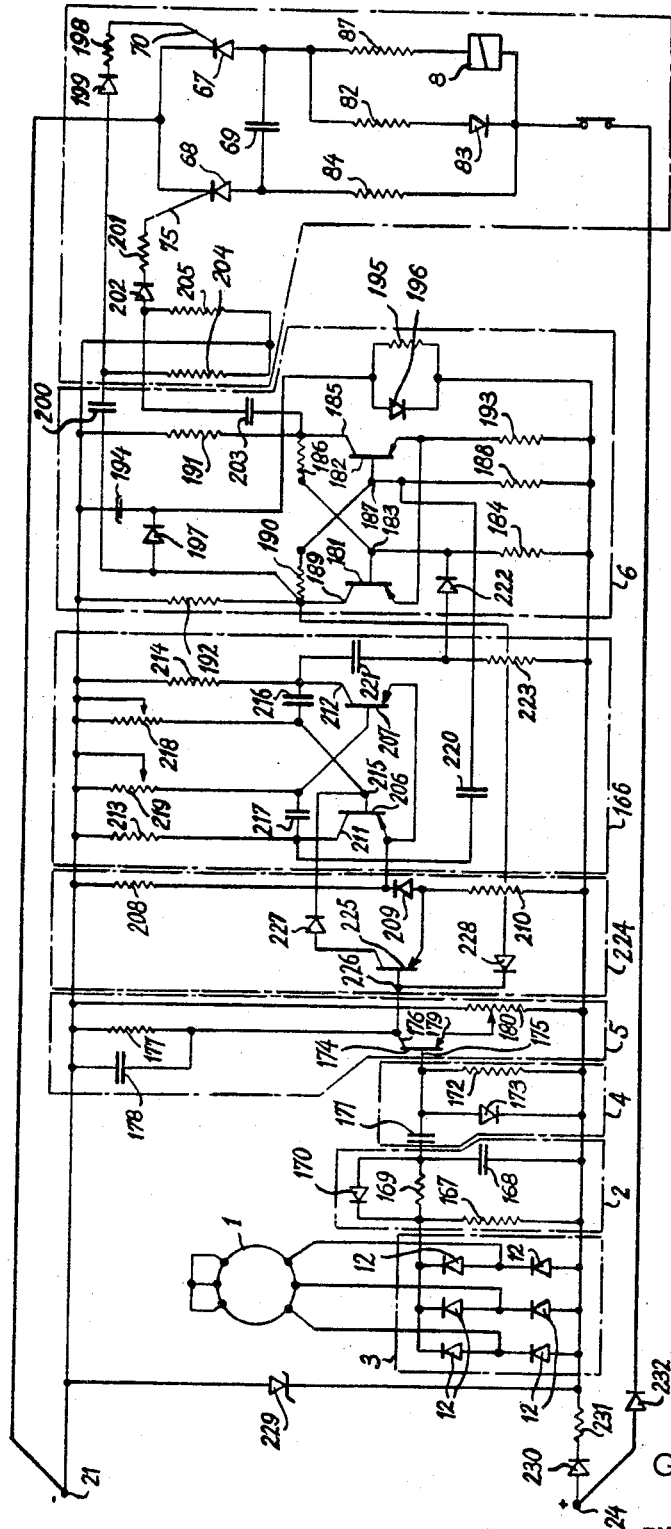
FIGURE 7 is a detailed electrical diagram of the apparatus shown in FIGURE 6.

A detailed example of this means is shown on FIG. 7. This means again includes the alternator 1, the rectifier 5 formed by a bridge of diodes 12. The filter unit 2 is made up by a resistance 167 mounted to the binding posts of the diode bridge and by a condenser 168 connected in parallel to the resistance 167 by way of a resistance 169. A diode 170 is connected to the leads of the resistance 169.

The shunt circuit 4 comprises a condenser 171 connected to the common lead of the condenser 168, the resistance 169 and the diode 170. The other lead of the condenser 171 is connected to the positive terminal 24 of the source of direct current by way of a resistor 172 and a diode 173 in parallel therewith.

The discriminator circuit 5 comprises a transistor 174 of the type PNP the base 175 of which is connected to the common lead to the condenser 171, the resistor 172 and the diode 173. The collector 176 of the transistor 174 is connected to the negative treminal 21 of the source of direct current by way of a resistor 177 and a condenser 178 in parallel therewith. The emitter 179 of the transistor 174 is polarized by a resistance 180 constituting a voltage divider between the leads 21 and 24 of the source of direct current. The regulation of the crest of discrimination is obtained by the adjustment of the connection of the emitter 179 to this resistance.

The bi-stable control unit 6 comprises two transistors 181 and 182 of the type PNP mounted with emitters in common. The base 183 of the transistor 181 is polarized by a resistance 184 connected to the positive terminal 24 and is coupled to the collector 185 of the transistor 182 by a resistance 186. In the same way, the base 187 of the transistor 182 is polarized by a resistance 188 connected to the positive terminal 24 and is coupled to the collector 189 of the transistor 181 by a resistance 190.

The charges of the collectors 185 and 189 are obtained respectively by the resistances 191 and 192 connected to the negative terminal 21. The polarization of the emitters of the transistors 181 and 182 is obtained by a resistance 193 connected to positive terminal 24.

This bi-stable control unit 6 is provided with a circuit permitting placing it in its initial state of operation when placed under voltage of the equipment. This circuit comprises a condenser 194 and a resistor 195 mounted in series and connected between the terminals 21 and 24 of the source of direct current. A diode 196 is connected across the resistor 195 and another diode 197 connected to the collector 189 of the transistor 181 and to the common terminal of the condenser 194 and of the resistor 195.

The power stage 7 is of the same type as that described in the preceding embodiment. The control electrode 70 of the thyratron 67 is connected to the collector 189 of the transistor 181 by way of a resistance 198, a diode 199 and a condenser 200, these three elements being in series.

In like manner the control electrode of the thyratron 68 is connected to the collector 185 of the transistor 182 by means of a resistor 201, a diode 202, and a condenser 203 connected in series. The common terminal of the diode 199 and condenser 200 and the common terminal of diode 202 and condenser 203 are connected to the negative terminal 21 respectively by the resistors 204 and 205.

The multivibrator 166 comprises two transistors 206 and 207 of the type PNP mounted with emitters in common. The polarization of the emitters is realized by means of a voltage divider connected between the terminals 21 and 24 of the direct current source and comprises a resistor 208, a diode 209 and another resistor 210 connected in series, the common emitters of the two transistors being connected to the common lead of the resistance 208 and the diode 209. The charge of collectors 211 and 212 of transistors 206 and 207 is obtained respectively by the resistances 213 and 214 connected to the terminal 21. The base 215 of the transistor 206 is connected to the collector 212 of the transisor 207 by way of a condenser 216.

Likewise, the base of the transistor 207 is connected to the collector 211 of the transistor 206 by a condenser 217. The polarization of the base 215 of transistor 206 is assured by means of a potentiometer 218 while the base of the transistor 207 is polarized by means of a potentiometer 219. The collector 211 of transistor 206 is coupled to the base 187 of the transistor 182 by a condenser 220. The collector 212 of the transistor 207 is coupled to the base 183 of the transistor 181 by means of a condenser 221 and a diode 222 connected in series. A resistance 223 is connected to the terminal 24 of the source of direct current and to the common lead of the condenser 221 and of the diode 222.

The counterreaction enabling locking the multivibrator at the course of a period of operation, is realized by a circuit 224. This circuit comprises a transistor 225 of the type PNP the base 226 of which is connected to the collector 176 of the transistor 174. The emitter of transistor 225 is connected to the common lead of the diode 209 and of the resistance 210 while the collector of transistor 225 is connected to the base 215 of the transistor 206 by way of a diode 227. The base 226 of transistor 225 is connected to the collector 189 of the transistor 181 by means of a diode 228.

The regulation of voltage applied to the apparatus is obtained by means of a Zener diode 229 connected between the terminals 21 and 24 of the source of direct current. A diode 230 and a resistance 231 mounted in series are inserted between the positive terminal 24 and the rectifier 3 while a diode 232 is inserted between the terminal 24 and the power stage 7.

The filter stage 2 of the apparatus which is being described presents the feature of constants of different times, that is, it transmits a signal with a greater or lesser delay according to the direction of variation of speed. Actually, during an instant of acceleration of the speed of the wheel, the constant of delay of the filter stage is determined by the assembly of resistance 167, 169 and condenser 168 while, in the control of deceleration, this contsant of delay corresponds only to the assembly of resistance 167, condenser 168 and the diode 170 providing in this case a short circuit of the resistance 169.

The general operation of this apparatus is that which has been indicated previously concerning the block diagram scheme of FIG. 6.

From the point of view of detail of operation, the diode 227 prevents the possibility of the discharge of condenser 216 toward the collector-emitter junction of the transistor 225 for the purpose of avoiding the unbalance of the multivibrator 166. The diode 209 assures locking the transistor 206 while the transistor 225 is conducting; this connection enables assurance of a fixed release of the control unit 6. The diode 222 assures the transmission of the condenser 221 toward the base 183 of the transistor 181, of the impulse according to a preference of direction facilitating the taking of position of the bi-state unit when placed under tension.

Otherwise in case of brief interruption of electric charging of a duration less than the time of charging the condenser 194, an extremely quick discharge of the condenser during the period of the interruption is effected across the circuit of resistance 195 and diode 196. This prevents the control unit 6 being in an uncertain state of transition at the start, mainly when it is placed under tension of the apparatus.

FIG. 8 illustrates an example of application of the means at the time of a sudden deceleration of the wheel, this sudden deceleration being represented on the figure by the curve 233. The broken line 234 represents the standard of the peak of discrimination which is capable of being regulated by the potentiometer 180. After the deceleration attains this standard 234 at point 235, the multivibrator 166 unlocks the bi-stable control unit 6 and the command unit 8 is energized almost instantly. This energization takes place during a period $T_1$ the value of which is controlled by the potentiometer 219. When the multivibrator 166 returns the control unit 6 to its initial state during a period $T_2$ the value of which is controlled by the potentiometer 218, the control unit is then no longer energized. This cycle controlled by the multivibrator 166 continues until the amplitude of deceleration of the wheel becomes less than the level 234 (point 236). If this is reached in the course of one period of operation, the circuit 224 enters into play and returns the multivibrator to its initial position.

The frequency of the in and out of service of the control unit 8 is chosen such that the successive release of air from the brake cylinders will not completely vent these cylinders. Further, the time controls $T_1$ and $T_2$ may be equal or unequal, are selected to obtain an efficient and fast control.

In the embodiments which have been described, the apparatus is arranged to be used specifically to prevent wheel slip or wheel locking. To enable use of this apparatus to avoid wheel spin by power, it requires reversal of the polarity of the rectifier diodes 3. This reversal may be made automatically by aid of a means of supplementary information. This means can consist of, for example, a comparison circuit connected to the output of the alternator and indicating the direction of variation of the voltage delivered by the alternator. The changing of use of this apparatus may be made manually, for example, after having registered a wide variation of pressure to the brake cylinders.

The invention is not limited only to the embodiments described and illustrated; it may also relate to variations within the scope of the appended claims.

Having now described the invention, what I claim as new and desire to secure by Letters Patent is:

1. Anti-wheel-slip control means for a vehicle wheel comprising, in combination:
   (a) means for establishing a brake application on the vehicle wheel,
   (b) means providing a signal voltage the amplitude of which is proportional to the acceleration or deceleration of a vehicle wheel and of opposite polarity depending on whether the wheel is decelerating or accelerating,
   (c) means providing a first constant reference voltage,
   (d) means providing a second constant reference voltage, and
   (e) voltage comparison means responsive to an excess of the amplitude of the signal voltage with respect to said first constant reference voltage during deceleration of the wheel for initiating a reduction in the degree of a brake application established on the wheel, and responsive to an excess of the amplitude of the signal voltage with respect to the said second constant reference voltage during acceleration of the wheel for terminating the reduction in the degree of the brake application and initiating a restoration of the degree of the brake application toward the degree originally established.

2. Anti-wheel-slip control means for a vehicle wheel as claimed in claim 1, further characterized in that said means providing a signal voltage includes:
   (a) a speed responsive signal generator means providing a voltage proportional to the instantaneous speed of the vehicle wheel, and
   (b) a differentiator circuit means acting cooperatively with said speed responsive signal generator means to convert said voltage proportional to the instantaneous speed to said signal voltage proportional to rate of deceleration or acceleration.

3. Anti-wheel-slip control means for a vehicle wheel as claimed in claim 1, further characterized by time delay means for effecting a limited delay in said reduction in the degree of brake application effected by said voltage comparison means to prevent oversensitivity of the brake release.

4. Anti-wheel-slip control means for a vehicle wheel as claimed in claim 1, further characterized by time delay means for effecting a limited delay in initiating said restoration of the brake application toward the degree originally established, following said reduction in the degree of brake application, effected by said voltage comparison means to prevent oversensitivity of the brake application.

5. Anti-wheel-slip control means for a vehicle wheel as claimed in claim 1, further characterized by time delay means for effecting a first limited delay in said reduction in the degree of brake application effected by said voltage comparison means and for effecting a second limited delay different in length from said first limited delay in initiating said restoration of the brake application toward the degree originally established following said reduction in the degree of brake application to prevent oversensitivity of the brake reduction and restoration effected by said voltage comparision means.

6. Anti-wheel-slip brake control means for a vehicle wheel comprising:
   (a) a brake cylinder,
   (b) conduit means via which fluid under pressure is supplied to said brake cylinder to effect a brake application,
   (c) valve means having one position in which it establishes a connection between said conduit means and said brake cylinder and closes a venting communication from said brake cylinder and a second position in which it closes the connection between said conduit means and the brake cylinder and opens the venting communication from said brake cylinder,
   (d) a volume chamber into which said venting communication opens, said volume chamber having a restricted orifice via which fluid under pressure discharged into said volume chamber from said brake cylinder escapes to atmosphere at a restricted rate, and
   (e) means responsive to a slipping condition of the vehicle wheel for effecting operation of said valve means to vent fluid under pressure from the brake cylinder upon deceleration of the wheel and for effecting operation of said valve means to restore the supply of fluid under pressure to the brake cylinder upon acceleration of the vehicle wheel.

7. Anti-wheel-slip control means for a vehicle wheel as claimed in claim 1 further characterized by:
   (a) a brake cylinder,
   (b) conduit means via which fluid under pressure is supplied to said brake cylinder to effect a brake application,
   (c) valve means having one position in which it establishes a connection between said conduit means and said brake cylinder and closes a venting communication from said brake cylinder and a second position in which it closes the connection between said conduit means and the brake cylinder and opens the venting communication from said brake cylinder,
   (d) electro-responsive control means operatively responsive to said voltage comparison means for controlling the positioning of said valve means, and
   (e) a volume chamber into which said venting communication opens, said volume chamber having a restricted orifice via which fluid under pressure discharged into said volume chamber from said brake cylinder escapes to atmosphere at a restricted rate.

8. Anti-wheel-slip control means for a vehicle wheel as claimed in claim 1, further characterized by multivibrator means operative responsively to an excess of the amplitude of the signal voltage with respect to said first constant reference voltage to initiate a series of successive reductions in the degree of the brake application initially established.

9. Anti-wheel-slip control means for a vehicle wheel as claimed in claim 1, further characterized by multivibrator means operative responsively to an excess of the amplitude of the signal voltage with respect to said first constant reference voltage to initiate a series of successive reductions in the degree of the established brake application upon deceleration incident to a wheel slip condition and the operative responsively to an excess of the amplitude of the signal with respect to the said second constant reference voltage incident to restoration of wheel speed to normal for terminating the reductions in the degree of the brake application and effecting restoration of said established brake application.

References Cited
UNITED STATES PATENTS 3,131,975   5/1964   Smith et al.
3,292,977   12/1966  Williams.

DUANE A. REGER, *Primary Examiner.*